United States Patent [19]

Tippmer

[11] Patent Number: 4,620,967

[45] Date of Patent: Nov. 4, 1986

[54] METHOD OF RECOVERING SULFUR IN A CLAUS PROCESS FROM VAPORS OBTAINED IN COKE OVEN GAS CLEANING

[75] Inventor: Kurt Tippmer, Recklinghausen, Fed. Rep. of Germany

[73] Assignee: Firma Carl Still GmbH & Co. KG, Fed. Rep. of Germany

[21] Appl. No.: 732,429

[22] Filed: May 9, 1985

Related U.S. Application Data

[63] Continuation of Ser. No. 593,731, Mar. 27, 1984, abandoned.

[30] Foreign Application Priority Data

Mar. 29, 1983 [DE] Fed. Rep. of Germany ....... 3311372

[51] Int. Cl.$^4$ ..................... B01D 53/34; B01D 53/36; C01B 17/04
[52] U.S. Cl. .................................... 423/236; 423/237; 423/574 R
[58] Field of Search ............... 423/574 R, 574 G, 576, 423/236, 237

[56] References Cited

U.S. PATENT DOCUMENTS

| | | |
|---|---|---|
| 3,822,337 | 7/1974 | Wunderlich et al. ............... 423/237 |
| 3,904,370 | 9/1975 | Robison ........................ 423/574 R |
| 4,088,744 | 5/1978 | Reed et al. ...................... 423/574 R |
| 4,124,685 | 11/1978 | Tarhan et al. ................... 423/574 L |
| 4,514,375 | 4/1985 | Laufhutte ........................... 423/576 |

Primary Examiner—John Doll
Assistant Examiner—Jeffrey Edwin Russel
Attorney, Agent, or Firm—McGlew and Tuttle

[57] ABSTRACT

The ammonia, hydrogen cyanide, and hydrogen sulfide scrubbed out of crude coke oven gases are decomposed and combusted, and sulfur is recovered therefrom in a Claus process, while using preheated air and effecting the decomposition and oxidation at temperatures varying through 100° C. at most, and keeping the temperature level of the entire process above 100° C. and allowing the residual gases to cool below this temperature only after the separation of sulfur, and controlling the air supply to maintain the ratio of $H_2S$ and $SO_2$ in the process gases above 2.

5 Claims, 1 Drawing Figure

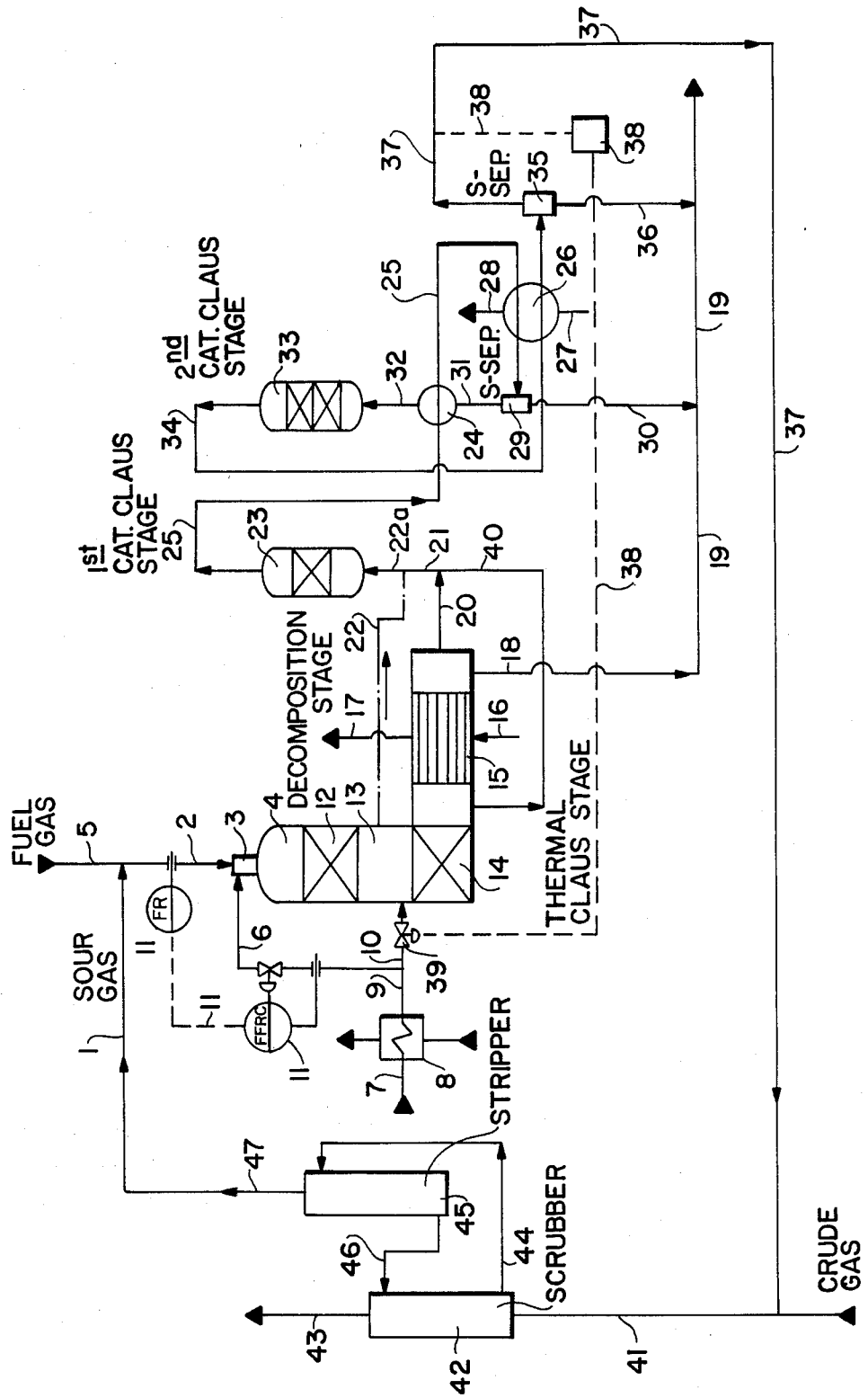

METHOD OF RECOVERING SULFUR IN A CLAUS PROCESS FROM VAPORS OBTAINED IN COKE OVEN GAS CLEANING

This is a continuation of application Ser. No. 593,731 filed Mar. 27, 1984, abandoned.

FIELD AND BACKGROUND OF THE INVENTION

The present invention relates in general to the recovery of sulfur from waste gases, and in particular to a new and useful method and arrangement for removing sulfur from sour gases which are produced by cleaning coke oven gases.

In a crude coke oven gas cleaning process, it may be provided that the vapors or sour gases from the cleaning plant, which plant comprises gas strippers as the last stage, contain the entire amount of hydrogen sulfide, the entire amount of ammonia, hydrogen cyanide, a part of the carbon dioxide, and a small proportion of benzene hydrocarbons. This may particularly be the case if ammonia and hydrogen sulfide are stripped from the crude oven gas in a so-called closed cycle ammonia-hydrogen sulfide scrubber. The content worth recovering of these sour gases is only the hydrogen sulfide which is processed to sulfuric acid or sulfur. The proportion of ammonia and hydrocyanic acid is of no interest and according to prior art methods, these substances may be decomposed and burned (see German Pat. No. 1,925,839; German AS No. 1,925,840; German AS No. 2,639,651; German Pat. No. 1,223,818; German Pat. No. 2,537,451; and German Pat. No. 1,926,629).

Methods for recovering sulfur from coke oven gases are known, for example from German Pat. Nos. 1,925,839, 1,926,629 and 2,537,451, and they provide combustion with fuel gas, or air enriched in both stages with hydrocarbons, or oxygen enriched air, or pure oxygen, all at ambient temperature, thus with a temperature of 5° to 25° C. Particular equipment is needed for producing oxygen or oxygen-enriched air. Therefore, economy calls for the use of air. Further, in the prior art, the two stages, namely the disintegration and the oxidation stages, operate at considerably different temperatures, the difference being at least 200° C., i.e. the oxidation stage operates at temperatures which are by about 200° C. higher than those of the disintegration stage. Heat economy would require a smaller difference. Also, the prior art oxidation stage is followed by cooling the gases in one or more stages, for example in a waste heat boiler and a cooler, and the cooling is conducted up to a separation of aqueous condensates from the gases. This is done because the water vapor produced during the combustion of fuel gas or hydrocarbons burdens the process gas and dilutes the sulfur compounds. Condensation of the water vapor does result in a concentration of sulfur compounds. The gas, however, must be cooled down to a point of condensation and then again brought up to about 200° to 400° C., the working temperature of the catalytic Claus reaction. This is an additional heat supply unfavorably affecting the total thermal balance. In addition, prior art processes frequently require a processing of the residual Claus gases including a hydrogenation and subsequent scrubbing to prevent formation of sulfur dioxide-containing waste gases, and their escape into the atmosphere or into the crude coke oven gas.

SUMMARY OF THE INVENTION

The present invention is directed to a new method of the above mentioned kind but which minimizes the temperature difference between the disintegration and thermal Claus stages, and eliminating the necessity of cooling the oxidized gases below the point of condensation and preheating them by further heat supply from the outside, such as in a gas heater or heat exchanger, as well as of further processing the residual Claus gases. The novel method satisfies these requirements and introduces economy by substantially reducing the needed heat supply and the cost of equipment, as compared to prior art processes.

Accordingly, an object of the present invention is to provide a method for the recovery of sulfur from vapor obtained during the cleaning of coke oven gas, which vapor contains hydrogen sulfide, hydrogen cyanide, ammonia and at least some hydrocarbons, comprising burning the hydrocarbons of the vapor with or without additional hydrocarbons, with preheated air to heat the vapor to a temperature for decomposing at least hydrogen cyanide and ammonia, supplying the heated vapor to a cracking reactor under substantially ambient pressure to decompose components of the vapor into hydrogen, nitrogen and carbon monoxide, adding preheated air to the vapor plus decomposed component and supplying the resulting mixture under ambient pressure to a thermal Claus reactor for burning a small amount of the hydrogen sulfide to sulfur dioxide to form a hot vapor mixture which has a temperature that is within 100° C. of the temperature of the vapor mixture from the cracking reactor, cooling the hot vapor mixture in a waste heat boiler to a temperature of about 150° C., mixing with the cooled vapor mixture some of the vapor plus decomposed component from the cracking reactor to bring the temperature of the resulting combined vapors to from about 210° C. to 240° C., and supplying the combined vapor to the first of a plurality of catalytic Claus reactors for extracting sulfur from the vapor. It is known that the vapor obtained during the cleaning of coke oven gas includes small amounts of various hydrocarbons.

A further object of the invention is to provide such a method wherein the decomposition in the cracking reactor takes place at from 1,150° C. to 1,200° C. and the temperature in the thermal Claus reactor is from 1,200° C. to 1,250° C.

A still further object of the invention is to provide such a method wherein the preheated air is supplied at a temperature of from 200° to 500° C. and preferably from 300° to 400° C.

In accordance with the invention, to obtain sulfur in a Claus method from the vapors of a coke oven gas cleaning process, the temperature of the ammonia and hydrogen sulfide containing vapors decreases continuously from the thermal Claus reactor to the first catalytic Claus reactor. No reheating with external heat or by heat exchange with process gases is necessary.

The first catalytic Claus reactor is filled with an aluminum catalyst known per e, and the sulfur vapor-containing reaction gases leave the reactor with a temperature of about 225° C., are cooled in a waste heat boiler, and sulfur in liquid form is drained, whereupon the gases having a temperature of about 210° C. enter the second catalytic Claus reactor. This reactor is filled in its lower part again with an aluminum oxide catalyst, but in its upper part it is filled with a catalyst containing titanium oxide. The gases having the temperature of about 230° leave the second Claus reactor and are cooled, whereby steam is obtained, or liquid sulfur is separated therefrom by heat exchange with process gas, so that they then become residual gases.

As compared to prior art methods, gases processed in accordance with the invention have a higher content in water vapor. The gas volumes are correspondingly larger. This disadvantage, however, is compensated by the great advantage that the entire operation takes place at a temperature level which is definitely above the point of water condensation.

The feature of preheating the combustion or decomposition air is known per se from the processing of gases which contain only hydrogen sulfide, but it is not known in connection with gases which must first be decomposed to make them suitable for the Claus process. (Ullmann's Enclopedia of Chemical Technology, 4th edition, vol. 21, 1982, page 11).

In prior art methods, a particular problem is the processing of the residual gas. A reasonable utilization is a recycling to the crude coke oven gas. There is a precondition, however, that the amount of sulfur dioxide contained therein is negligible. On the other hand, a measurable content in hydrogen sulfide may be tolerated.

Another object of the invention is to provide such a method for recovering sulfur in which the amount of preheated air which is supplied is adjusted so that the ratio of $H_2S$ to $SO_2$ is more than 2.

A still further object of the invention is to provide a method in which the addition of heated air is controlled, through a sensing of the $H_2S$ content in residual gas leaving the last catalytic Claus stage to obtain a total $SO_2$ content in the residual gas of less than 400 part per million. The air may be added by a hand operation or through suitably provided control equipment.

If a recycling of the residual gas into the crude coke oven gas is intended, the invention provides that the $H_2S$ content in the residual gas is from 0.5 to 1.2% by volume.

If no recycling into the crude coke oven gas is provided, the residual gas may still be further processed in accordance with one of the prior art methods. For example, a subsequent thermal or catalytic combustion may be provided. Or a direct after-scrubbing with a part of the ammonical liquor of a $H_2S$ scrubber may be affected. or the undesirable components of the residual gases may be intercepted in microfilters, or, in larger units, a hydrogenation with a corresponding after-scrubbing may be provided.

In an advantageous modification of the method, the water vapor content of the sour gas is controlled by controlling the gas condensation. This is because it is necessary, due to the presence of benzene hydrocarbons, always to maintain a certain water vapor concentration in the gas, to prevent a carbon separation.

A still further object of the invention is to provide an arrangement for recovering sulfur from vapor obtained during the cleaning of coke oven gases which is simple in design, rugged in construction, economical to manufacture and economical to operated.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE in the drawings is a schematic diagram showing one embodiment of the invention.

DESCRIPTION OF THE PREFERRED EMBODIMENT

Referring to the drawing in particular, the invention embodied therein is an arrangement for practicing a method of extracting sulfur from the sour gases or vapors which are produced when coke oven gas from a coke oven battery is cleaned.

Through lines 1 and 2, 1,234 $Nm^3$ (standard cubic meters) of sour gases having a temperature of 70° to 75° C. and a pressure of 1.35 bar are supplied to a burner 3 in a combustion chamber 4. The sour gases have the following composition: 18.5% by volume of $H_2S$; 32.5% of $NH_3$; 2.4% of HCN; 18% of $CO_2$; 27.2% of $H_2O$ and 1.4% by volume of BTX (benzenehydrocarbons). A line 5 is provided for supplying additional fuel gas. In the present example, however, no additional gas is admixed. Through a line 7 and an air heater 8, and through lines 9 and 6, burner 3 is supplied with 1,440 $Nm^3$ preheated air having a temperature of 200° to 500° C. and preferably 300° to 400° C. The exact amount is adjusted through a control 11. In a cracking reactor 12, the ammonia and the hydrogen cyanide are completely disintegrated at temperatures of 1,150° to 1,200° C., and at pressures of 1.2 to 1.3 bar. The gaseous products of disintegration downstream of cracking reactor 12 amount to about 3019 $Nm^3$ per hour, and contain 7.5% by volume of $H_2S$ plus COS, and 13% by volume of $H_2$ plus CO. In a chamber 13, the gases of disintegration are mixed with a further 490 Nm of air having a temperature of 300° to 400° C. and coming from line 10. In this way, a total of 3505 $Nm^3$ of gases is obtained from a thermal Claus reactor 14, having a temperature of 1,200° to 1,250° C., and to process them to sulfur, a $H_2S/SO_2$ ratio of more than 2 and preferably 2.35 is adjusted. An amount of 2945 $Nm^3$ of this gas passes into waste heat boiler 15 and is there cooled down to not less than about 150° C. Operating water is supplied to the boiler through a line 16, and 2.5 tons per hour of steam are drawn out through a line 17. Discharged from boiler 15 are 2,900 $Nm^3$ of gas per hour having a content of 6.5% by volume of $H_2S+COS+SO_2$ and 11.35% by volume of $H_2+CO$. Through a line 18, 126 Kg per hour of already condensed sulfur in liquid form is drained and directed into sulfur collecting main 19. The gas cooled to 150° C. leaves boiler 15 through line 20 and in line 21, the remaining 560 $Nm^3$ per hour of uncooled gaseous products of disintegration are added through a line 22. The mixture having a temperature of 230° C. passes through line 22a into the first catalytic Claus reactor 23.

This reactor contains beds of an aluminum oxide-base catalyst. The total catalyst amount is 9,000 kg. The gases having a temperature of 255° C. pass from reactor 23 through a line 25, heat exchanger 24, and line 25, into a waste heat boiler 26. This boiler is supplied with water through a line 27, and steam is discharged therefrom through a line 28 in an amount of 0.12 tons per hour and with a pressure of 2 bar. In a separator 29, 113 kg per hour of liquid sulfur are separated and driected through a line 30 into collecting main 19. The gases pass through a line 31 and are heated up again in heat exchanger 24, to 210° C. With this temperature, the gases pass through a line 32 into the second catalytic Claus reactor 33 which is filled in its lower beds with an aluminum oxide-base catalyst (6,500 kg) and above with a titanium oxide-base catalyst (2,500 kg). Through a line 34, the gases leave the second Claus reactor, pass through waste heat boiler 26 and reach a sulfur separator 35. The 34 kg per hour of liquid sulfur here separated are drained through a line 36 and directed to collecting main 19. A total of 273 kg per hour of sulfur is produced. The residual gas is removed through a line 37, in an amount of 3,420 Nm$^3$ per hour, with a temperature of 125° C. The air supply into chamber 13 is controlled by the H$_2$S content in the residual gas. For this purpose, a control unit 38 with a control valve 39 in lines 10 are provided. The bypass line 40 at boiler 15 represents another possible temperature control. The residual gas escaping through line 37 is recycled to the crude coke.

As shown in the FIGURE, crude coke oven gas line 41 supplies gas to a scrubber 42. Gas leaves the scrubber on line 43 as clean gas, i.e. gas which has been freed of hydrogen sulfide, hydrogen cyanide, carbonoxy sulfide, and other impurities. Gas washing liquor is circulated and reaches, through a line 46, scrubber 42 where it absobs the acid gases and leaves through a line 44. A stripper 45 receives the washing liquor on line 44 which is stripped of acid gas components which were absorbed in the gas scrubber 42. The stripper acid gases leave the stripper through line 47 and are supplied into a line 1. Line 1 thus carries sour gas to line 2 as explained above and described in detail to illustrate the application of the principles of the invention, it will be understood that the invention may be embodied otherwise without departing from such principles.

What is claimed is:

1. A method of recovering sulfur in a Claus process, from sour gas vapor obtained during the cleaning of coke oven gas, which vapor contains hydrogen sulfide, hydrogen cyanide, ammonia and BTX, comprising:
   supplying the coke oven gas (41) to a scrubber (42) for scrubbing out hydrogen sulfide, hydrogen cyanide and ammonia from the coke oven gas using washing liquors, BTX contained in the coke oven gas being scrubbed out at the same time;
   stripping (45) the scrubbed out substances from the washing liquors to form the sour gas vapor (1) which contains hydrogen sulfide, hydrogen cyanide, ammonia and BTX;
   burning the BTX of the vapor with only enough preheated air (6) at a temperature of 200° to 500° C., to heat the vapor to a temperature for decomposing hydrogen cyanide and ammonia;
   supplying the heated vapor to a cracking reactor (12) under substantially ambient pressure to decompose components of the vapor into hydrogen, nitrogen and carbon monoxide;
   adding preheated air (10) at a temperature of 200° to 500° C., to the vapor plus decomposed components (13);
   supplying some of the vapor plus decomposed components with the preheated air to a thermal Claus reactor (14) under ambient pressure for burning some of the hydrogen sulfide in the vapor to form sulfur dioxide and to form a hot vapor mixture which is at a temperature within 100° C. of the temperature of the vapor plus decomposed components in the cracking reactor;
   cooling the hot vapor mixture in a waste heat boiler (15) to a temperature of about 150° C. to form a cooled vapor mixture (20);
   mixing the cooled vapor mixture (21) with some of the vapor plus decomposed components (22) from the cracking reactor to bring the temperature of the combined vapor to about 210° to 240° C. (22a);
   supplying the combined vapor (22a) to a first catalytic Claus reactor (23) to form at least some sulfur;
   supplying the vapor (25) from the first catalytic Claus reactor (23) to a second catalytic Claus reactor (33) to extract additional sulfur;
   separating out the sulfur (35) to form a residual gas (37);
   measuring the content of hydrogen sulfide in the residual gas (38) and adding the amount of preheated air (39, 10) to the vapor plus the decomposed components to adjust the total sulfur dioxide content of the residual gas to less than 400 ppm, and
   recycling the residual gas (37) to the coke oven gas to be scrubbed with the hydrogen sulfide content being maintained between 0.5 to 1.2% by volume.

2. A method according to claim 1, including adding fuel gas (5) to the sour gas vapor (1) before it is burned to provide additional heating for the vapor.

3. A method according to claim 2, wherein the operating temperature of said cracking reactor (12) is maintained at from 1,150° to 1,200° C. and the temperature of the thermal Claus reactor (14) is kept at from 1,200° to 1,250° C.

4. A method according to claim 3, wherein the air to be added (6, 10) is preheated to from 300° to 400° C.

5. A method according to claim 4, wherein the preheated air added to the vapor plus decomposed components (10) is controlled (38, 39) to obtain a hydrogen sulfide to sulfur dioxide ratio of more than about 2.35.

* * * * *